United States Patent
Azulay et al.

(10) Patent No.: US 11,876,814 B2
(45) Date of Patent: *Jan. 16, 2024

(54) PROXY SERVICES FOR THE SECURE UPLOAD OF FILE SYSTEM TREE STRUCTURES

(71) Applicant: MICROSOFT TECHNOLOGY LICENSING, LLC, Redmond, WA (US)

(72) Inventors: Itamar Azulay, Mishmar Ayyalon (IL); Guy Lewin, New York, NY (US); Sharon Lifshits, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,863

(22) Filed: Mar. 8, 2023

(65) Prior Publication Data
US 2023/0319072 A1   Oct. 5, 2023

Related U.S. Application Data

(63) Continuation of application No. 17/364,168, filed on Jun. 30, 2021, now Pat. No. 11,627,150.

(51) Int. Cl.
*G06F 15/173* (2006.01)
*H04L 9/40* (2022.01)
(Continued)

(52) U.S. Cl.
CPC ...... *H04L 63/1416* (2013.01); *H04L 63/1425* (2013.01); *H04L 63/20* (2013.01);
(Continued)

(58) Field of Classification Search
CPC ............ H04L 63/1416; H04L 67/561; H04L 63/1425; H04L 63/20; H04L 67/02; H04L 67/06; H04L 67/109
(Continued)

(56) References Cited

U.S. PATENT DOCUMENTS

8,813,214 B1 * 8/2014 McNair ............... H04L 63/145
726/22
9,852,377 B1 * 12/2017 Kumar ..................... G06N 5/04
(Continued)

OTHER PUBLICATIONS

Curwin, et al., "Anomaly detection policies in Defender for Cloud Apps", Retrieved From: https://learn.microsoft.com/en-us/defender-cloud-apps/anomaly-detection-policy#malware-detection, Mar. 5, 2023, 13 Pages.

*Primary Examiner* — Liang Che A Wang
(74) *Attorney, Agent, or Firm* — Shook, Hardy & Bacon L.L.P.

(57) ABSTRACT

The disclosure is directed towards proxy services for the secure uploading of file-system tree structures. A method includes receiving, at a web security service, an indication that client device to upload content to a storage cloud provider. The proxy service performs a security scan of the content while the content is stored on the client device. A security and/or a privacy concern is identified in the content stored on the client device. A security and/or privacy mitigation action is performed in response to identifying the security and/or privacy concern.

20 Claims, 7 Drawing Sheets

(51) Int. Cl.
*H04L 67/561* (2022.01)
*H04L 67/02* (2022.01)
*H04L 67/06* (2022.01)
*H04L 67/1097* (2022.01)

(52) U.S. Cl.
CPC .............. *H04L 67/02* (2013.01); *H04L 67/06* (2013.01); *H04L 67/1097* (2013.01); *H04L 67/561* (2022.05)

(58) Field of Classification Search
USPC .................................... 709/223, 224; 726/26
See application file for complete search history.

(56) References Cited

U.S. PATENT DOCUMENTS

| | | | |
|---|---|---|---|
| 2007/0038681 A1* | 2/2007 | Pierce ................. | G06F 11/1469 |
| 2013/0097666 A1* | 4/2013 | Wu ..................... | H04L 63/1425 |
| | | | 726/1 |
| 2017/0223049 A1* | 8/2017 | Kuperman .......... | H04L 63/0281 |
| 2018/0181769 A1* | 6/2018 | Vora ..................... | H04L 63/105 |
| 2018/0189142 A1* | 7/2018 | Stevanovic .......... | H04L 63/1425 |
| 2020/0320194 A1* | 10/2020 | Blass ...................... | G06F 21/72 |
| 2020/0412697 A1* | 12/2020 | Lewin .................... | H04L 63/20 |
| 2021/0400106 A1* | 12/2021 | Karin ..................... | G06F 21/51 |

* cited by examiner

//PROXY SERVICES FOR THE SECURE UPLOAD OF FILE SYSTEM TREE STRUCTURES

CROSS-REFERENCE TO RELATED APPLICATIONS

This application is a continuation of U.S. patent application Ser. No. 17/364,168, filed on Jun. 30, 2021, and titled "PROXY SERVICES FOR THE SECURE UPLOAD OF FILE SYSTEM TREE STRUCTURES," the entirety of which is hereby incorporated by reference.

BACKGROUND

Many file systems structure or organize files within hierarchical tree and/or sub-tree structures. The root node of a tree (or sub-tree) structure is often referred to as a root-directory and the sub-nodes of the root-directory may be referred to as sub-directories. That is, each node of a tree corresponds to a directory (or a sub-directory of the root directory). One or more files may be associated with each node in the tree or sub-tree. When a file is associated with a node, the file is said to be located within the directory (or sub-directory) that corresponds to the node. This tree of directories may be a convenient "virtual" model of the file system's actual or physical structure. The details of the actual structure of most file systems may be significantly more complicated, where data associated with each file may be distributed across a plurality of data blocks. The data blocks for any given file may be distributed across non-consecutive regions of a magnetic or solid-state storage disk. That is, data for files may be physically segmented.

Nevertheless, ever since the early days of the internet, web browsers have enabled users to "upload" a file to a web service, via the user employing a user interface (UI) of the browser to select a file (located within a directory of their file system). Modern web browsers have advanced to the point where a user may upload an entire tree or sub-tree structure of directories (including all the files located within the root directory and all of the files located in each of the root-directory's sub-folders) via one or more selection mechanisms (e.g., a "drag and drop" mechanism). Being enabled to upload such hierarchical structures of directories/files presents numerous security issues for both the uploading system and a system that receives the uploaded directory tree.

SUMMARY

Various aspects of the technology described herein are generally directed to systems, methods, and computer storage media, for among other things, employing proxy services for the secure uploading of file-system tree structures. One exemplary, but non-limiting, method may include receiving, at a proxy service, an indication that a client device is to upload content to a storage cloud provider. Through the proxy service, a security scan of the content may be performed. In some embodiments, the content is scanned while the content is stored on the client device. In other embodiments, the content may be provided to the proxy service, and scanned at the proxy service. A security and/or a privacy concern may be identified within the content on the client device. A security and/or privacy mitigation action may be taken in response to identifying the security and/or privacy concern.

In some embodiments, the security and/or privacy scan includes scanning the content and additional content that is stored in a storage bin (e.g., a file-system tree structure) with the content. The storage bin may be a tree structure that includes a hierarchy of one or more file folders (e.g., file directories and/or sub-directories). In some embodiments, the security and/or privacy concern may not be in the content. For example, the security and/or privacy concern may be in the additional content.

In at least one embodiment, the method further includes communicating the request to the storage cloud provider. A storage cloud provider's website code for a content selection interface may be received. A security service code may be injected into the storage cloud provider's website code, by the proxy service, to create security-injected website code. The security-injected website code may be communicated to the client device. In some embodiments, the security and/or privacy mitigation action may include preventing the content from being uploaded to the storage cloud provider. In other embodiments, the security and/or privacy mitigation action may include providing an indication to the storage cloud provider that the client device poses a security threat.

Some embodiments include a system that includes at least one hardware processor and one or more computer-readable media having executable instructions embodied thereon. When the instructions are executed by the at least one hardware processor, the at least one hardware processor may perform operations that are included in one or more methods. At least one method includes transmitting, from a client device, a request addressed to a storage cloud provider. A security-injected client code for a storage cloud provider's interface may be received at the client device. The security-injected client code may be received from a proxy service. The storage cloud provider's interface may be provided for display (e.g., at the client device). A selection designating a content for upload to the storage cloud provider may be received (e.g., at the client device), through the interface. A security and/or privacy-related mitigation message may be received (e.g., at the client device) from the proxy service.

In some embodiments, the security and/or privacy mitigation message indicates that a security and/or a privacy concern was found in a file folder in which the content is stored. The security and/or privacy concern may not be in the content. The method may further include uploading the content to the storage cloud provider. The method may further include the security-injected client code performing a security scan of the content. The method may further include the security-injected client code performing a security scan of a storage bin in which the content is stored. The security-injected client code may be wrapped.

Some embodiments include computer storage media storing computer-useable instructions. When the instructions are used by at least one computing device, cause the at least one computing device to perform one or more methods. One such example (and non-limiting) method includes injecting, by a proxy service, a security service code into a storage cloud provider's client interface code to create a security-injected client code. The security-injected client code may be communicated to a client device. A request from the client device may be received at the client device. The request may be a request to upload one or more files to a storage cloud provider. A security scan of the content may be performed through the proxy service. The scan may be performed while the content is stored on the client device. In other embodiments, the scan may be performed at the proxy service (e.g., the content may be provided to the security service). A security and/or privacy-based rule violation may be identified and/or detected in content on the client device (or at the proxy service). A security and/or privacy mitigation action may be taken in response to identifying the security concern.

In some embodiments, the security scan may be performed through the security-injected client code. The security scan may include scanning the file and additional content that is stored in a folder with the file. The additional content may be in subfolders within the folder. The security and/or privacy rule violation may be information in the file that violates a privacy policy. The security and/or privacy mitigation action may include preventing the content from being uploaded to the storage cloud provider.

BRIEF DESCRIPTION OF THE DRAWINGS

The technology described herein is described in detail below with reference to the attached drawing figures, wherein.

DETAILED DESCRIPTION

Figure 1:
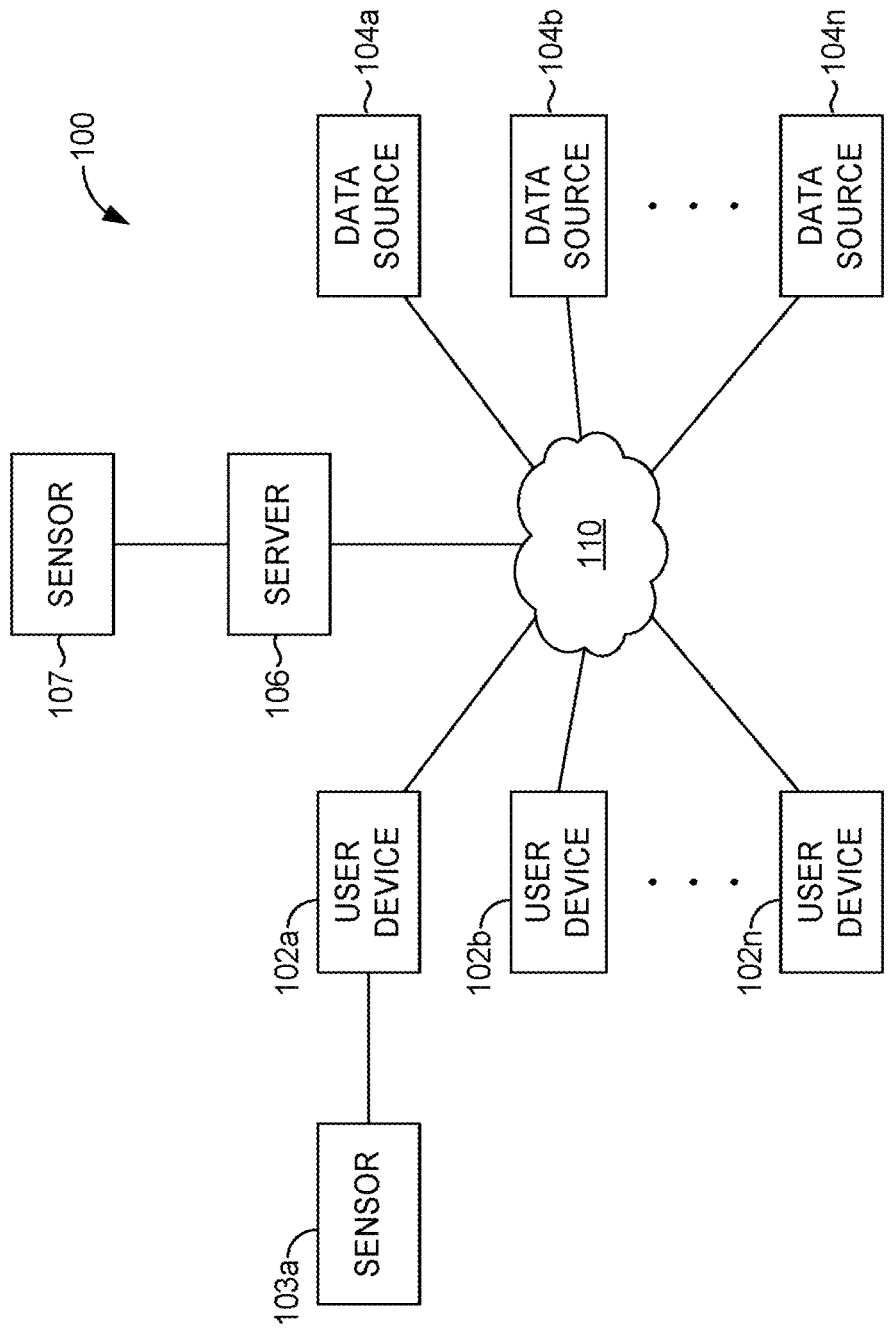
FIG. 1 illustrates a block diagram showing an example operating environment in which some embodiments of the present disclosure may be employed.

Overview of Technical Problems, Technical Solutions, and Technological Improvements As used herein, the term "set" may be employed to refer to an ordered (i.e., sequential) or an unordered (i.e., non-sequential) collection of objects (or elements), such as but not limited to machines (e.g., computer devices), physical and/or logical addresses, graph nodes, graph edges, and the like. A set may include N elements, where N is any non-negative integer. That is, a set may include 0, 1, 2, 3, . . . N objects and/or elements, where N is a positive integer with no upper bound. Therefore, as used herein, a set may be a null set (i.e., an empty set), that includes no elements (e.g., N=0 for the null set). A set may include only a single element. In other embodiments, a set may include a number of elements that is significantly greater than one, two, three, or billions of elements. A set may be an infinite set or a finite set. In some embodiments, "a set of objects" that is not a null set of the objects may be interchangeably referred to as either "one or more objects" or "at least one object." A set of objects that includes at least two of the objects may be referred to as "a plurality of objects."

As used herein, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjoint sets if the intersection between the two sets is the null set.

The various embodiments are directed to employing a proxy session to secure the uploading of a file system's tree structure or a sub-tree structure of a file system. Because a sub-tree structure is inherently a tree structure, as used throughout, a sub-tree structure may be referred to as a tree-structure. Each node in a tree may correspond to a directory and/or a sub-directory. Each directory and/or sub-directory may include one or more data files. Some directories need not include a file and/or a sub-directory. Accordingly, such tree structures may be hierarchical in nature and include a root directory logically located at the top of the tree's hierarchical structure. That is, the root directory corresponds to the tree's root node. Some tree structures may include one or more sub-directories logically positioned below the root directory in the tree's hierarchical structure. One or more of the sub-directories may include one or more other sub-directories logically positioned below the sub-directory in the hierarchical structure, resulting in a cascade of directories. The tree structure may terminate in one or more sub-directories (e.g., corresponding to leaf nodes of the tree). As used throughout, the terms "directory" and "folder" may be used interchangeably, as well as the terms "sub-directory" and "sub-folder."

In the embodiments, a web security service may be deployed in the context of a user employing a web browser to upload a tree structure of data files. For instance, a user may employ a web browser to select a tree structure of their device's file system. The web security service may serve as a proxy service that scans at least portions of (if not the entirety of) the data logically located within the tree-structure. For example, each file stored within the hierarchy of directories and sub-directories of the tree-structure may be scanned for potential security threats and potentially sensitive information. If a potential security threat and/or potentially sensitive information is detected, one or more interventions may be employed. Such one or more interventions may include preventing the upload from occurring. Other interventions may include deleting sensitive information and/or insecure portions of the data (e.g., portions of code that may be viral in nature) from the data that is ultimately uploaded. In at least one embodiment, an alert may be provided to a user when a security-related or a sensitivity-related issue with the data to be uploaded is detected. In order to quarantine such issues, the scanning of the data logically located within the tree may be performed within a sandbox of the web browser.

In one non-limiting embodiment, a user may employ a web browser (e.g., a browser) to select a tree structure of a file system to which they have access. The selection of the tree structure may be with the intent to upload all data logically located in the tree structure (e.g., all directories, sub-directories, and files logically located within the directories and sub-directories) to a web server. Prior to initiating the uploading, the web security service (WSS) acting as a proxy service may scan all such data. In at least one embodiment, as a proxy service, the WSS may detect an intention to upload data to a target destination (e.g., a web server). For example, the WSS may intercept one or more upload-related data packets intended for the upload's target destination. In response, the WSS may at least temporarily pause the uploading of data, via one or more application programming interface (API) function calls to the browser. The WSS may gain access to at least a portion of the file system that includes the tree-structure. For instance, when a user selects the tree-structure via their browser, the browser may have access to at least that portion of the file system. The WSS may gain access to that portion via one or more API calls to the web browser. The WSS may scan the associated data within a sandbox of the web browser. If no security and/or sensitivity issues are detected within the scanned data, the WSS may resume the upload to the target destination via one or more API calls. If one or more security issues are detected, the WSS may perform one or more interventions through one or more API calls. For example, the WSS may terminate the upload process, delete portions of data associated with the detected issues from the upload process, and/or provide the user (and/or the target destination) with one or more warnings and/or alerts.

In other embodiments, the scanning of the data may be performed at the WSS. For example, again as a proxy service, the WSS may intercept the uploading of the tree structure (and its data). The WSS may scan the data one or more devices that implement the WSS (e.g., server devices remote from the user's client device). For example, the WSS may implement a sandbox at its implementing server device. The data may be scanned within such a sandbox. If no issues are flagged during the scanning, the WSS may relay the uploaded content to the target destination (e.g., the intended web server). If one or more issues are detected within the uploaded data, then the WSS may perform one or more interventions.

Overview of Environments for the Secure Upload of File-System Tree Structures

Aspects of the technical solution can be described by way of examples and with reference to FIG. 1 and additional illustrations below. FIG. 1 illustrates a block diagram showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and communication network 110. It should be understood that environment 100 shown in FIG. 1 is an example of one suitable operating environment. Each of the components shown in FIG. 1 may be implemented via any type of computing device, such as computing device 700 described in connection to FIG. 7, for example. These components may communicate with each other via network 110, which may include, without limitation, a local area network (LAN) and/or a wide area networks (WAN). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100; data structures 120, 140, and 160 described in connection to system 200 described in connection to FIG. 2. Data sources 104a and 104b through 104n may be discrete from user devices 102a and 102b through 102n and server 106 or may be incorporated and/or integrated into at least one of those components. In one embodiment, of data sources 104a through 104n comprise sensors 103a, 107, which may be integrated into or associated with the user device(s) 102a, 102b, or 102n or server 106. Examples of sensed user data made available by data sources 104a through 104n may include events.

Figure 2:
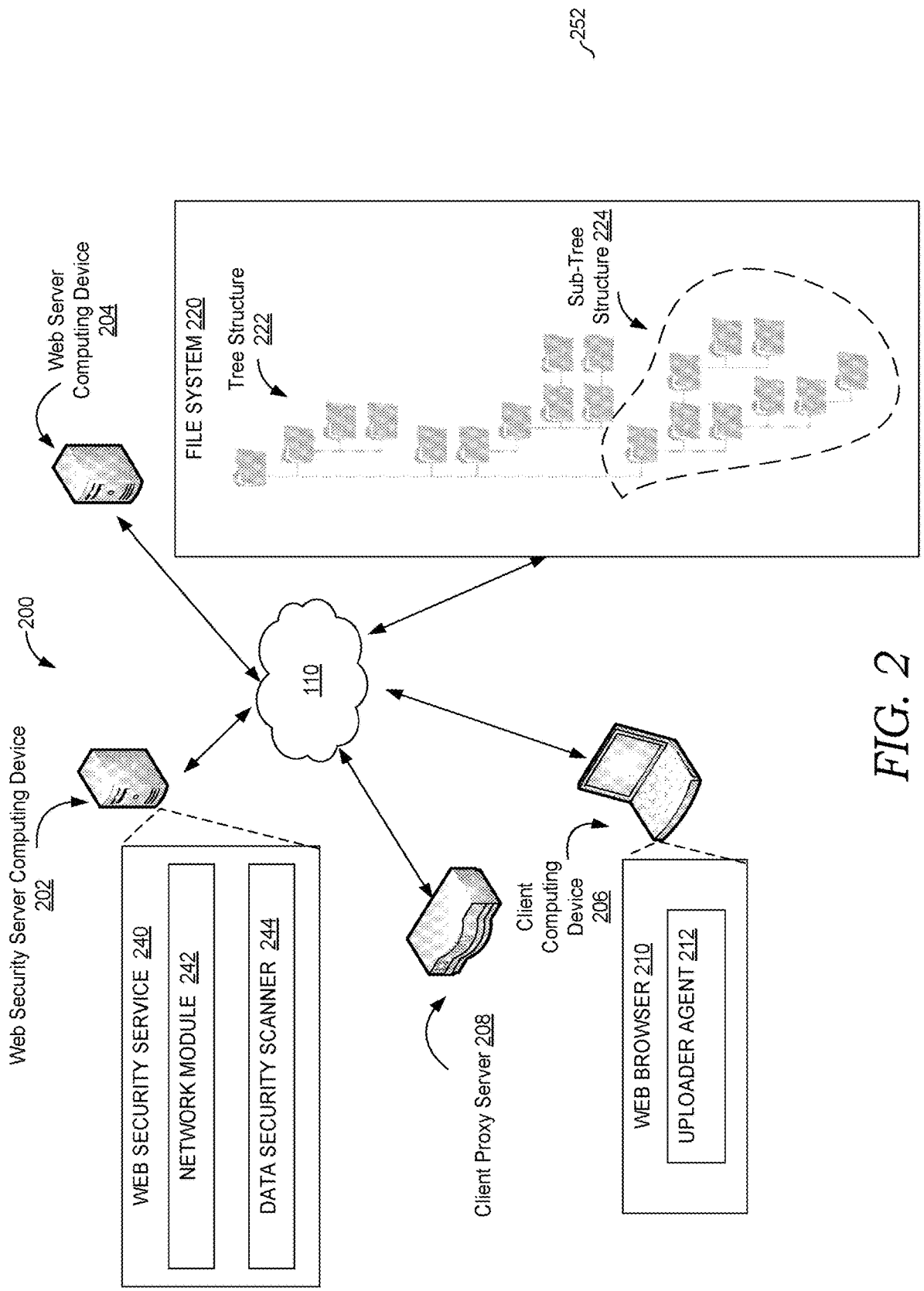
FIG. 2 illustrates a block diagram showing an example web security system in which some embodiments of the present disclosure may be employed.

Operating environment 100 can be utilized to implement a component of the components of an enhanced web security system 200, described in FIG. 2, including components for proxy services for the secure upload of file-system tree structures. Operating environment 100 also can be utilized for implementing aspects of process flows 300-600 described in conjunction with FIGS. 3-6.

Overview of Example of Proxy Services for the Secure Upload of File-System Tree Structures FIG. 2 illustrates a block diagram showing an example web security system 200 in which some embodiments of the present disclosure may be employed. System 200 may be implemented via one or more components of environment 100 of FIG. 1. System 200 may include web security service (WSS) 240 implemented by one or more computing devices (e.g., web security server computing device 202). System 200 may additionally include a client computing device 206 and a web-server computing device 204. In some non-limiting embodiments, system 200 may include a client proxy server 208. The web security server computing device 202, the web-server computing device 204, the client computing device 206, and/or the client proxy server 208 may be communicatively coupled via communication network 110 of FIG. 1.

The web-server computing device 204 may host or otherwise implement a web application (e.g., a cloud-computing application, a web page, and/or a web application). The WSS 240 may provide web (or cloud) security proxy services to the client computing device 206. In embodiments where the application is a cloud application, rather than a web application, the web security server computing device 202 may be a cloud security server computing device and the WSS may be a cloud security service. Whether the application is a web-based application or a cloud-based, the WSS 240 may provide security services for the secure upload of file-system tree structures, from the client computing device 206 to the web-server computing device 204.

The client computing device 206 may have access to a file system 220. In some embodiments, the file system 220 is implemented locally on client computing device 206. For example, the file system may manage content stored on a storage device that is local to the client computing device 206. In other embodiments, the file system 220 is remote to the client computing device 206. For instance, the file system 220 may be implemented by another computer device, and the file system 220 manages content stored on a storage device that is remote to the client computing device 206, e.g., a remotely mounted storage device. The file system 220 may include and/or manage a hierarchical tree structure 222. The tree structure 222 may include a hierarchy (e.g., a tree) of cascading file directories and filed sub-directories, e.g., folders and sub-folders. One of more of the directories and/or sub-directories may include one or more files. Thus, the tree structure 222 may include a hierarchical set of files. The files may encode content (e.g., data and/or information).

To interact with a cloud-based application, a web-based application, and/or a web page implemented by web-server computing device 204, a user may employ the client computing device 206. More specifically, the user may employ web browser 210 implemented by the client computing device 206 (or another device that client computing device 206 may access via communication network 110) to interact with any application or web page implemented by web-server computing device 204. In some embodiments, the web browser 210 may include an uploader agent 212. The uploader agent 212 may enable the user to select at least a portion of the tree structure 222 to upload to the web-server computing device. As shown in FIG. 2, the user has selected sub-tree structure 224 to upload to web-server computing device 204. Uploader agent 212 is enabled to initiate and perform an upload session with the web-server computing device 204. The entirety of the contents of the sub-tree structure 224 may be uploaded to the web-server computing device 204 in the upload session. The uploaded contents may include all the directories, sub-directories, and files included in the sub-tree structure 224.

In the various embodiments, the WSS 240 may act as a proxy service to manage the upload session. The client proxy server 208 may at least enable the WSS 240 to act as a proxy service to the client computing device 206.

The WSS may include a network module 242 to communicate with each of client proxy server 208, client computing device 206, and web-server computing device 204. The WSS 240 may additionally include a data security scanner (DSS) 244. The DSS 244 is generally responsible for scanning the contents (e.g., data and/or information) being uploaded from client computing device 206 to web-server computing device 204. More specifically, the WSS 240 may be deployed in the context of the user employing the web browser 210 to upload the sub-tree structure that includes a plurality of directories and data files. The WSS 240 acts as a proxy service that scans at least portions of (if not the entirety of) the data logically located within the sub-tree structure 224. For example, each file stored within the hierarchy of directories and sub-directories of the sub-tree structure 224 may be scanned for potential security threats and potentially sensitive information. If a potential security threat and/or potentially sensitive information is detected, one or more interventions may be employed. Such one or more interventions may include preventing the upload from occurring. Other interventions may include deleting sensitive information and/or insecure portions of the data (e.g., portions of code that may be viral in nature) from the data that is ultimately uploaded. In at least one embodiment, an alert may be provided to a user when a security-related or a sensitivity-related issue with the data to be uploaded is detected. In order to quarantine such issues, the scanning of the data logically located within the sub-tree structure 224 may be performed within a sandbox of the web browser 210.

As noted above, a user may employ the operations of the uploader agent 212 to select the sub-tree 224 from the tree structure 222. The selection of the sub-tree structure 224 may be with the intents to upload all data logically located in the sub-tree structure 224 (e.g., all directories, sub-directories, and files logically located within the directories and sub-directories) to a web server. The WSS may receive an indication of an initiation of the upload session and then scan all such data prior to the data being uploaded to the web-server computing device 204. In at least one embodiment, as a proxy service, the WSS 240 may detect an intention to upload data to a target destination (e.g., a web server). For example, the WSS 240 may intercept one or more packets indicating an initiation of an upload session (e.g., with a target destination of the web-server computing device 204). In response, the WSS 240 may at least temporarily pause the uploading session, via one or more application programming interface (API) function calls to the browser 210. The WSS 240 may gain access to at least a portion of the file system 220 that includes the sub-tree structure 224. For instance, when a user selects the sub-tree structure 224 via browser 210, the uploader agent 212 may gain access to at least the portion of the file system 220 that includes the sub-tree structure 224. The DSS 244 may gain access to that portion of the file system 220 via one or more API call to the web browser 210. The DSS 244 may scan the associated data within a sandbox of the web browser 210. If no security and/or sensitivity issues are detected within the scanned data, the WSS 240 may resume the upload session and provide the sub-tree structure 224 (and its associated data) to the upload session's target destination (e.g., web-server computing device 204) via one or more API calls. If one or more security (or data sensitivity) issues are detected, the WSS 240 may perform one or more interventions through one or more API calls. For example, the WSS 240 may terminate the upload session, delete portions of data associated with the detected issues from the upload process, and/or provide the user (and/or the target destination) with one or more warnings and/or alerts.

In other embodiments, the scanning of the data may be performed at the WSS 240. For example, again as a proxy service, the WSS 240 may intercept the uploading of the sub-tree structure 224 (and its data). The DSS 244 may scan the data (at one or more devices that implement the WSS, e.g., the web security server computing device 202). For example, the DSS 244 may implement a sandbox at the web security server computing device 202. The data may be scanned within such a sandbox. If no issues are flagged during the scanning, the network module 242 may relay the uploaded content to the target destination (e.g., the web-server computing device 204). If one or more security and/or sensitivity issues are detected within the uploaded data, then the WSS 240 may perform one or more interventions.

Example Methods for the Secure Upload of
File-System Tree Structures

FIGS. 3-6 provide flow diagrams that illustrate various methods (e.g., methods 300-600) for proxy services that secure the uploading of file-system tree structures. Any of methods 300-600 may be implemented and/or performed by using any of the embodiments of a web security service (WSS), such as but not limited to WSS 240 of FIG. 2. In embodiments, one or more computer storage media having computer-executable instructions embodied thereon that, when executed, by one or more processors can cause the one or more processors to perform the methods in the storage system. Generally, the flow diagrams of FIGS. 3-6 can be implemented using the architectures described above at least in conjunction with FIGS. 1-2. For example, any suitable combination of portions of methods 300-600 may be implemented by WSS 240.

Figure 3:
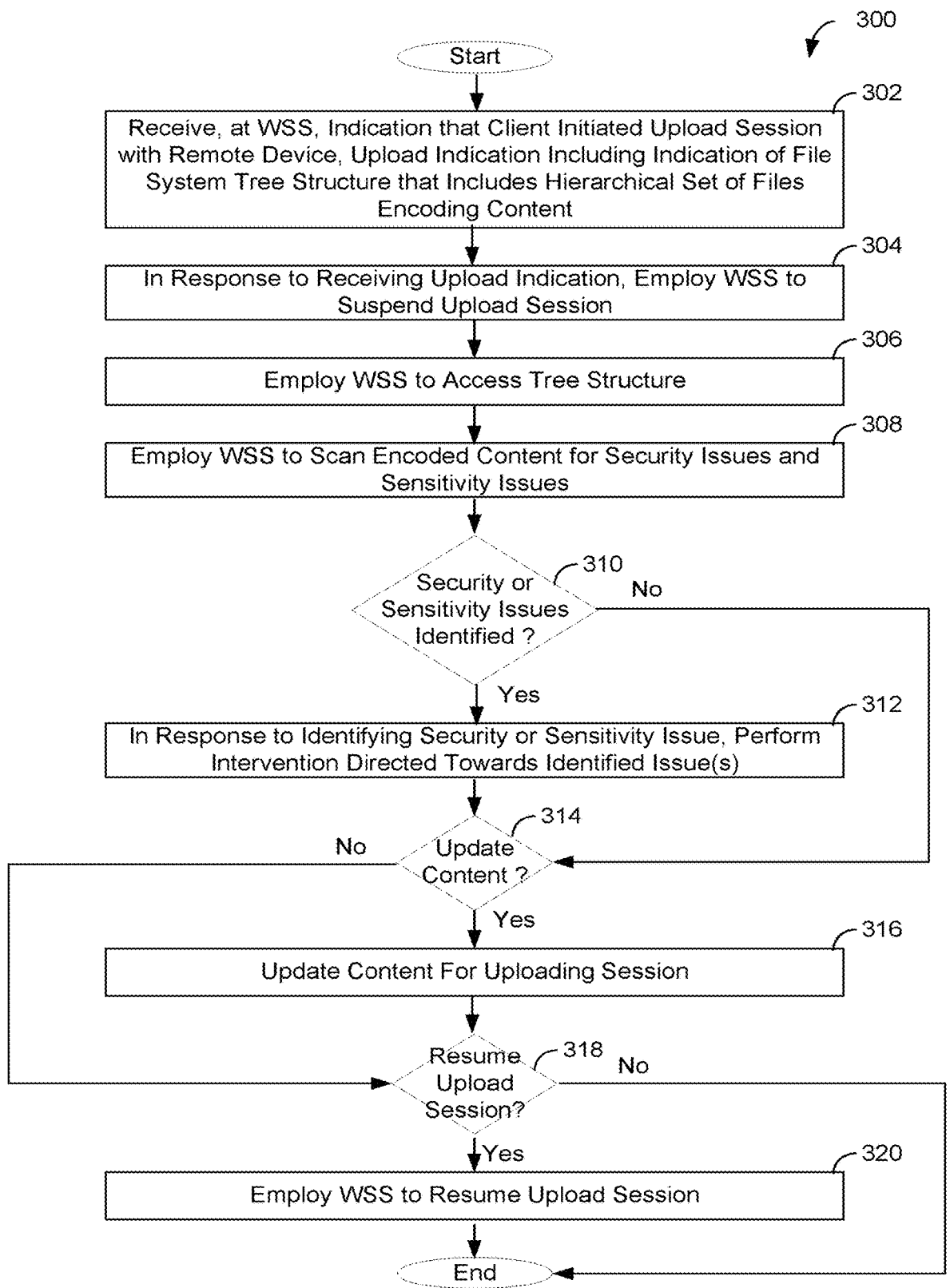
FIGS. 3-6 provide flow diagrams that illustrate various methods for employing proxy service to secure an upload of a file-system tree structure.

Turning to FIG. 3, FIG. 3 provides a flow diagram that illustrates a non-limiting method 300 for employing a proxy service to secure the uploading of a file-system tree structure, in accordance with the various embodiments. Initially, method 300 begins at block 302, where an indication (e.g., an upload indication) that a client initiated an upload session with a remote device is received at a web security service (e.g., WSS 240 of FIG. 2). The upload indication may include an indication of a file-system tree structure (e.g., sub-tree structure 224 of FIG. 2) that includes a hierarchical set of files encoding content (e.g., data and/or information). The files may include source code, content for documents, and the like. At block 304, in response to receiving the upload indication, the WSS may be employed to at least temporarily suspend the upload session. At block 306, the WSS may be employed to access the tree structure. For example, the WSS may issue an API call to a web browser employed by a user of the client to initiate the upload session. At block 308, the WSS may be employed to scan the content (accessed at block 306). For example, the DSS 244 of FIG. 2 may scan the data included in the entirety of the files stored in each of the directories/sub-directories included in the tree structure for security issues and/or sensitivity (e.g., data privacy) issues. In some embodiments, the data scan may be directed towards scanning the data to identify portions of the content that include data and/or information that may be correlated with one or more computer and/or network security issues. For example, the content may be scanned via one or more virus scanning methods. The scanning may also be directed towards identifying portions of the content that include sensitive information (e.g., data that may be subject to data privacy issues). In order to quarantine such security and/or privacy issues, the scanning may be performed within a security sandbox of the web browser.

At decision block 310, it is determined whether the data scan performed at block 308 has identified and/or detected any security and/or data sensitivity issues. If any such issues have been detected during the data scan, method 300 may flow to block 312. If no security and/or sensitivity/privacy issues are identified, the method 300 may flow to decision block 314. At block 312, in response to identifying one or more security and/or sensitivity issues, one or more interventions, directed at the identified issues, may be performed. Such one or more interventions may include preventing the upload from occurring. Other interventions may include deleting sensitive information and/or insecure portions of the data (e.g., portions of code that may be viral in nature) from the data that is ultimately uploaded. In at least one embodiment, an alert may be provided to a user when a security-related or a sensitivity-related issue with the data to be uploaded is detected. From block 312, method 300 may flow to decision block 314.

At decision block 314, it is determined whether the scanned content should be updated. If the scanned content is to be updated, method 300 may flow to block 316. If the scanned content is not be updated, then method 300 may flow to decision block 318. At block 316, the WSS may update the content to be upload. For example, the WSS may delete portions of the content. In at least some embodiments, the WSS may inject data into the content. For example, the WSS may inject executable code, privacy statements, alerts, warnings, or any of such information into the content to be uploaded. In at least one embodiment, anti-virus software may be injected into the content. Method 300 may flow to decision block 318. At decision block 318, it is determined whether to resume the upload session. If the upload session is to be resumed, method 300 may flow to block 320. If the upload session is not be resumed, method 300 may terminate. At block 320, the WSS may be employed to resume the upload session. When the upload session is resumed, the tree structure may be uploaded to the intended target of the upload session. In embodiments where the content is updated, either through the performance of an intervention at block 312 or an update of the content at block 316, the updated content may be uploaded to the intended target destination.

Figure 4:
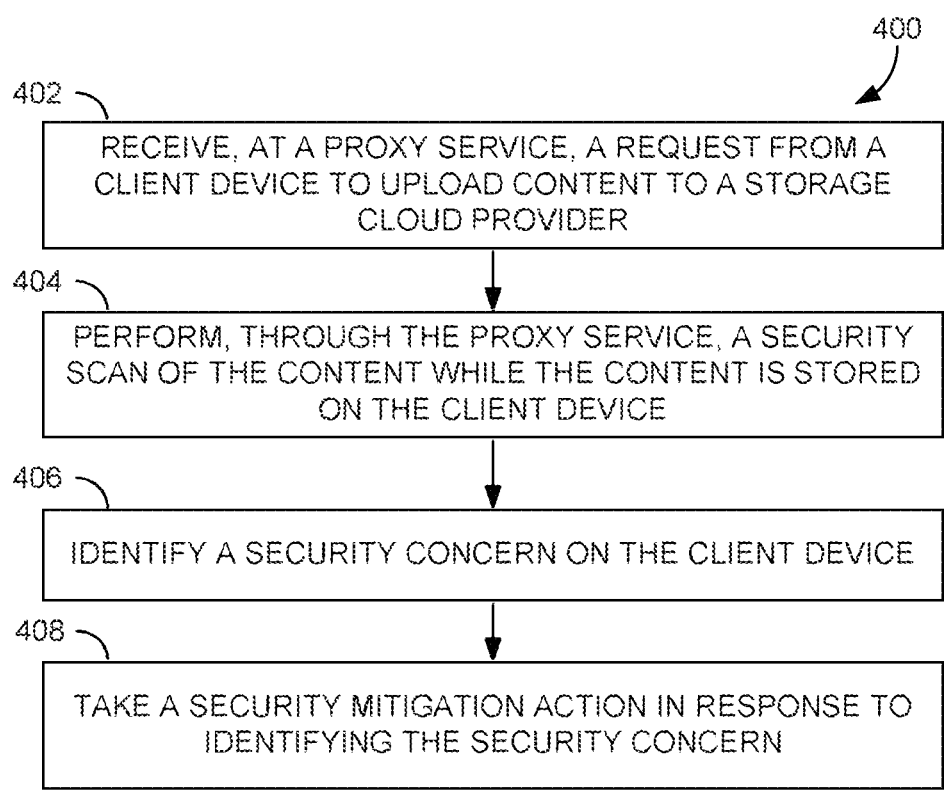

FIG. 4 provides a flow diagram that illustrates a non-limiting method 400 for the secure uploading of a content, in accordance with the various embodiments. Initially, method 400 begins at block 402, where a request from a client device is received at a proxy service (e.g., WSS 240 of FIG. 2). The request may be a request to upload content to a remote device (e.g., a storage cloud provider). The remote device may be a web server (e.g., web-server computing device 204 of FIG. 2). In one embodiment, the web-server computing device 204 may implement cloud storage. Thus, an operator of the web-server computing device 204 may be a storage cloud provider. The content may be content included in a file-system tree-structure (e.g., sub-tree structure 224 of FIG. 2). The request may have been received from, or at least originally transmitted by a client device (e.g., client computing device 206).

At block 404, a security scan of the content is performed by the proxy service. In some embodiments, the DSS of FIG. 2 may scan the content for security and/or data sensitivity/privacy issues. In some embodiments, the content is scanned at the client device. In other embodiments, the content may be scanned at the proxy service (e.g., the content may be uploaded to and scanned at web security server computing device 202 of FIG. 2). At block 406, one or more security and/or privacy concerns may be identified with the content stored on the client device. At block 408, one or more security mitigation actions may be performed in response to identifying the security and/or privacy concerns.

Figure 5:
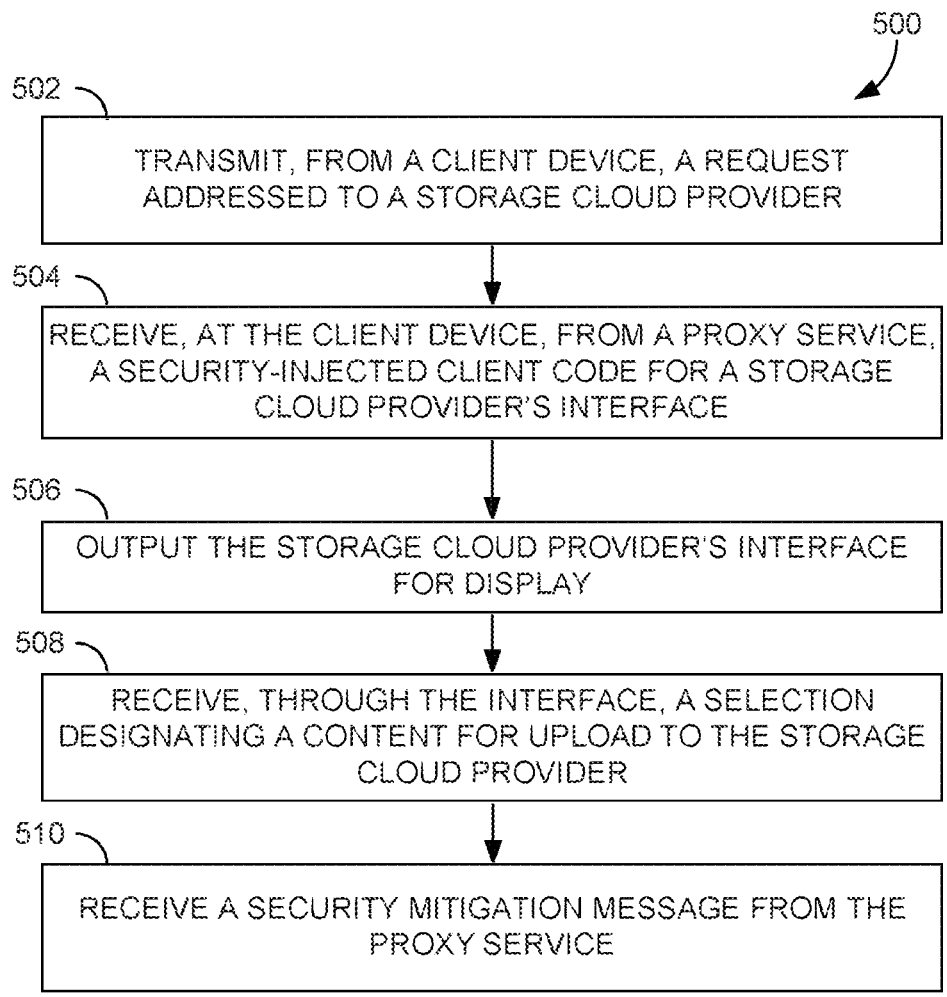

FIG. 5 provides a flow diagram that illustrates a non-limiting method 500 for the secure uploading of a content, in accordance with the various embodiments. Initially, method 500 begins at block 502, where a client device transmits a request addressed to a remote device (e.g., a device operated by a storage cloud provider). At block 504, security-injected client code may be received at the client device. The security injected code may be received from a proxy service for the client device. The security-injected (executable) code may be for user interface for the storage cloud provider. At block 506, the storage cloud provider's interface may be provided for display. For example, the client device may display the interface. At block 508, a selection designating content for upload to the storage cloud provider may be received through the interface. At block 510, a security mitigation message may be received from the proxy service. For instance, the message may be received at the client device.

Figure 6:
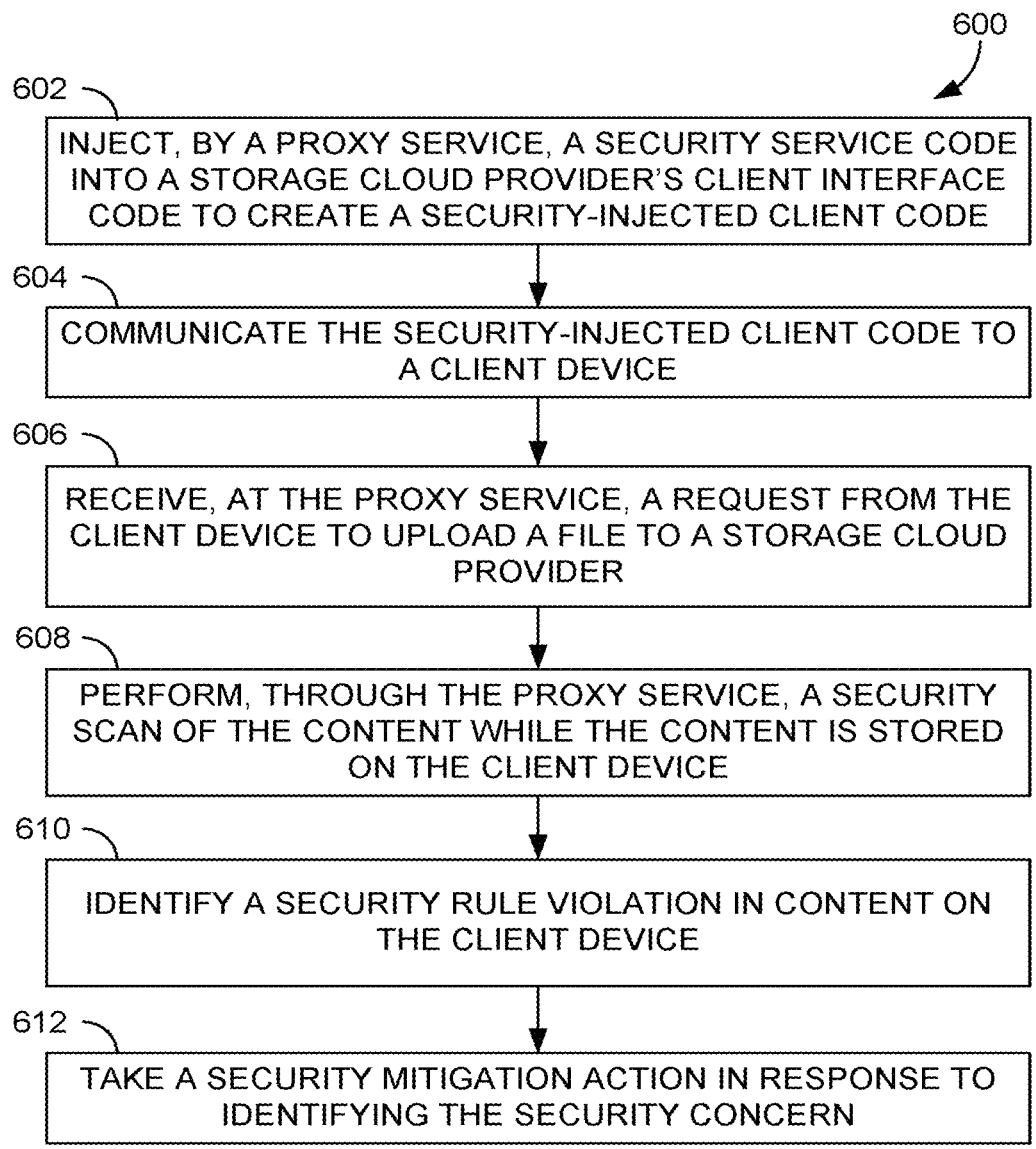

FIG. 6 provides a flow diagram that illustrates a non-limiting method 600 for the secure uploading of a content, in accordance with the various embodiments. Initially, method 600 begins at block 602, where a proxy service injects a security service code into a storage cloud provider's client device to create security-injected client code. At block 604, the security-injected code is communicated to a client device. At block 606, a request is received at the proxy service. The request may be from a client device. The request may be a request to upload a file-system tree structure (e.g., a tree that includes one or more directories and/or one or more files) to a storage cloud provider. Accordingly, the request may be a request to upload one or more files to the storage cloud provider. At block 608, a security scan may be performed through the proxy service. The scan may be a scan of content included in the one or more files. The scan may be performed while the content is stored on the client device. In other embodiments, the one or more files may be uploaded from the client device to the proxy service. In such embodiments, the scan may be performed while the content is stored at the proxy service. At block 610, a security and/or privacy rule violation may be identified and/or detected in the scanned content. At block 612, a security mitigation action may be taken in response to identifying the security and/or privacy concern.

Generalized Computing Device

Figure 7:
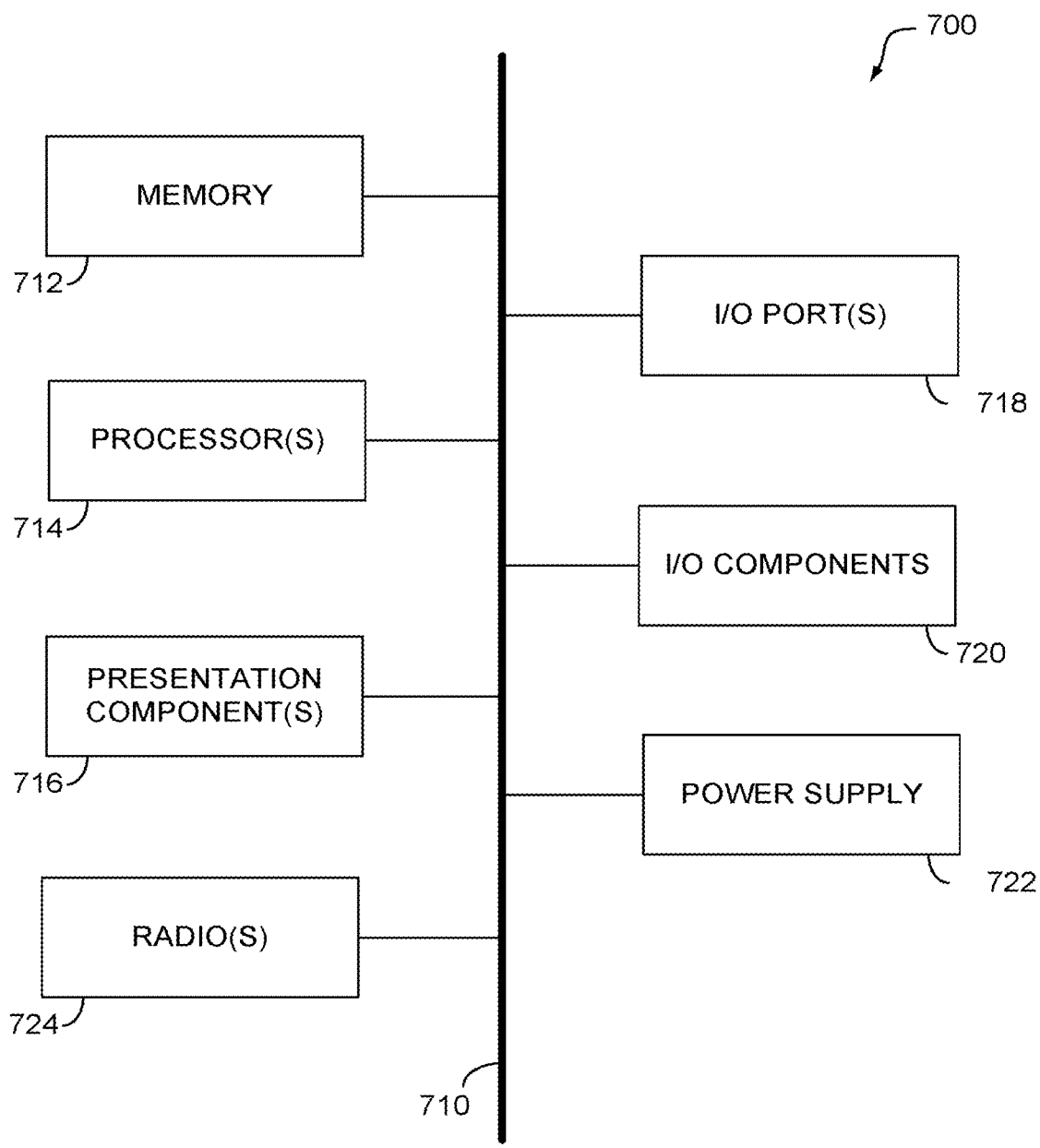
FIG. 7 is a block diagram of an exemplary computing device for use in implementing aspects of the technology described herein.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Other examples of presentation components may include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present disclosure.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Embodiment 1. A computer-implemented method for controlling information. The method comprising receiving, at a proxy service, an indication that a client device to upload content to a storage cloud provider. The method also comprising performing, through the proxy service, a security scan of the content while the content is stored on the client device. The method also comprising identifying a security concern on the client device. The method also comprising taking a security mitigation action in response to identifying the security concern.

Embodiment 2. The method of embodiment 1, wherein the security scan includes scanning the content and additional content that is stored in a storage bin with the content.

Embodiment 3. The method of embodiment 2, wherein the storage bin is a file folder.

Embodiment 4. The method of embodiment 2, wherein the security concern is not in the content and wherein the security concern is in the additional content.

Embodiment 5. The method as in any one of the above embodiments, further comprising communicating the request to the storage cloud provider. The method also comprising receiving a storage cloud provider's website code for a content selection interface. The method also comprising injecting, by the proxy service, a security service code into the storage cloud provider's website code to create security-injected website code. The method also comprising communicating the security-injected website code to the client device.

Embodiment 6. The method as in any one of the above embodiments, wherein the security mitigation action is preventing the content from being uploaded to the storage cloud provider.

Embodiment 7. The method as in any one of the above embodiments, wherein the security mitigation action comprises providing an indication to the storage cloud provider that the client device poses a security threat.

Embodiment 8. A system comprising: at least one hardware processor and one or more computer-readable media having executable instructions embodied thereon, which, when executed by the at least one hardware processor, cause the at least one hardware processor to perform operations comprising transmitting, from a client device, a request addressed to a storage cloud provider. The operations also comprising receiving, at the client device, from a proxy service, a security-injected client code for a storage cloud provider's interface. The operations also comprising outputting the storage cloud provider's interface for display. The operations also comprising receiving, through the interface, a selection designating a content for upload to the storage cloud provider. The operations also comprising receiving a security mitigation message from the proxy service.

Embodiment 9. The system of embodiment 8, wherein the security mitigation message indicates a security concern was found in a file folder in which the content is stored.

Embodiment 10. The system of embodiment 9, wherein the security concern is not in the content.

Embodiment 11. The system of embodiment 10, wherein the method further comprises uploading the content to the storage cloud provider.

Embodiment 12. The system as in any one of embodiment 8, 9, 10, and 11 wherein the method further comprises the security-injected client code performing a security scan of the content.

Embodiment 13. The system as in any one of embodiment 8, 9, 10, 11, and 12, wherein the method further comprises the security-injected client code performing a security scan of a storage bin in which the content is stored.

Embodiment 14. The system as in any one of embodiment 8, 9, 10, 11, 12, and 13, wherein the security-injected client code is wrapped.

Embodiment 15. Computer storage media storing computer-useable instructions that, when used by at least one computing device, cause the at least one computing device to perform actions comprising injecting, by a proxy service, a security service code into a storage cloud provider's client interface code to create a security-injected client code. The method further comprising communicating the security-injected client code to a client device. The method further comprising receiving, at the proxy service, a request from the client device to upload a file to a storage cloud provider. The method further comprising performing, through the proxy service, a security scan of the content while the content is stored on the client device. The method further comprising identifying a security rule violation in content on the client device. The method further comprising taking a security mitigation action in response to identifying the security concern.

Embodiment 16. The media of embodiment 15, wherein the security scan is performed through the security-injected client code.

Embodiment 17. The media of embodiment 15, wherein the security scan includes scanning the file and additional content that is stored in a folder with the file.

Embodiment 18. The media of embodiment 17, wherein the additional content is in subfolders within the folder.

Embodiment 19. The media of embodiment 17, wherein the security rule violation is information in the file that violates a privacy policy.

Embodiment 20. The media of as in any one of embodiments 15, 16, 17, 18, and 19, wherein the security mitigation action is preventing the content from being uploaded to the storage cloud provider.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for controlling information, the method comprising:
    receiving, at a client device, a selection designating a content for upload to a web device that is remote from the client device;
    transmitting, from the client device to a proxy service, a request to upload content to the web device that is remote from the client device;
    in response to the request, receiving, at the client device, a security code from the proxy service programed to scan the content before upload;
    receiving a security mitigation message from the security code indicating that a security scan detected a security concern in the content; and
    taking a security mitigation action in response to the security concern.

2. The method of claim 1, wherein the security scan includes scanning the content and additional content that is included in a file system tree structure indicated by the request.

3. The method of claim 2, wherein the file system tree structure includes at least one root directory and at least one sub-directory located within the at least one root directory.

4. The method of claim 2, wherein the security concern is associated with the additional content and the additional content is located within a sub-directory included file system tree structure.

5. The method of claim 1, wherein the web device is operated by a storage cloud provider and the method further comprises:
    communicating the request to a storage cloud provider;
    receiving a storage cloud provider's website code for a content selection interface;
    injecting, by the proxy service, the security code into the storage cloud provider's website code to create a security-injected website code; and
    communicating the security-injected website code to the client device.

6. The method of claim 1, wherein the security mitigation action includes preventing the content from being uploaded to the web device.

7. The method of claim 1, wherein the security mitigation action comprises providing an indication to the web device that the client device poses a security threat.

8. A system comprising:
    at least one hardware processor; and
    one or more computer-readable media having executable instructions embodied thereon, which, when executed by the at least one hardware processor, cause the at least one hardware processor to perform operations comprising:
        transmitting, from a client device, a request addressed to a storage cloud provider;
        receiving, at the client device, from a proxy service, a security client code for a storage cloud provider's interface;
        outputting the storage cloud provider's interface for display;
        receiving, through the interface, a selection designating a content for upload to the storage cloud provider;
        enabling, at the client device, the security client code to scan the content before upload; and
        receiving a security mitigation message from the security client code indicating that a security scan detected a security concern in the content.

9. The system of claim 8, wherein the security mitigation message indicates a security concern was found in a file folder in which the content is stored.

10. The system of claim 9, wherein the security concern is not in the content.

11. The system of claim 10, wherein the method further comprises uploading the content to the storage cloud provider.

12. The system of claim 8, wherein the method further comprises the security-injected client code performing a security scan of the content.

13. The system of claim 8, wherein the method further comprises the security-injected client code performing a security scan of a storage bin in which the content is stored.

14. The system of claim 8, wherein the security-injected client code is wrapped.

15. Computer storage media storing computer-useable instructions that, when used by at least one computing device, cause the at least one computing device to perform actions comprising:
    obtaining, by a proxy service, a security client code;
    communicating the security client code to a client device;
    receiving, at the proxy service, a request from the client device to upload a file to a storage cloud provider;
    performing, through the proxy service, a security scan of the content while the content is stored on the client device;
    identifying a security concern in content on the client device; and
    taking a security mitigation action in response to identifying the security concern.

16. The media of claim 15, wherein the method further comprises:
    injecting, by a proxy service, a security service code into a storage cloud provider's client interface code to create the security client code;
    and wherein the security scan is performed through the security-injected client code.

17. The media of claim 15, wherein the security scan includes scanning the file and additional content that is stored in a folder with the file.

18. The media of claim 17, wherein the additional content is in subfolders within the folder.

19. The media of claim 17, wherein the security rule violation is information in the file that violates a privacy policy.

20. The media of claim 15, wherein the security mitigation action is preventing the content from being uploaded to the storage cloud provider.

* * * * *